US012700894B2

(12) United States Patent  
Cordier

(10) Patent No.: US 12,700,894 B2  
(45) Date of Patent: Aug. 4, 2026

(54) TESTING OF NEAR-FIELD COMMUNICATION CARD AND READER

(71) Applicant: STMicroelectronics International N.V., Geneva (CH)

(72) Inventor: Nicolas Cordier, Aix-en-Provence (FR)

(73) Assignee: STMicroelectronics International N.V., Geneva (CH)

( * ) Notice: Subject to any disclaimer, the term of this patent is extended or adjusted under 35 U.S.C. 154(b) by 400 days.

(21) Appl. No.: 18/450,558

(22) Filed: Aug. 16, 2023

(65) Prior Publication Data

US 2025/0062792 A1 Feb. 20, 2025

(51) Int. Cl.  
    *H04B 5/00*         (2024.01)  
    *H04B 5/77*         (2024.01)

(52) U.S. Cl.  
    CPC ....................................... *H04B 5/77* (2024.01)

(58) Field of Classification Search  
    CPC ........................................................ H04B 5/77  
    See application file for complete search history.

(56) References Cited

U.S. PATENT DOCUMENTS

| | | | | |
|---|---|---|---|---|
| 9,425,907 | B2 | 8/2016 | Dhayni et al. | |
| 9,898,634 | B2 * | 2/2018 | Thouin | G06K 7/10465 |
| 10,198,727 | B1 * | 2/2019 | Rezayee | H04L 27/12 |
| 10,574,303 | B1 * | 2/2020 | Hueber | H04B 5/24 |
| 11,190,236 | B2 * | 11/2021 | Houdebine | H04B 5/266 |
| 2014/0349586 | A1 * | 11/2014 | Dhayni | H04B 17/00 |
| | | | | 455/67.14 |
| 2015/0249510 | A1 * | 9/2015 | Dhayni | H04B 17/21 |
| | | | | 455/41.1 |
| 2015/0270912 | A1 * | 9/2015 | Dhayni | H04B 17/201 |
| | | | | 455/41.1 |
| 2016/0037286 | A1 * | 2/2016 | Narasimhan | H04B 5/73 |
| | | | | 455/41.1 |
| 2018/0128670 | A1 * | 5/2018 | Sears | G01F 23/0007 |
| 2019/0325177 | A1 * | 10/2019 | Tornambe | H04B 5/45 |
| 2020/0036412 | A1 * | 1/2020 | Hueber | H04B 5/24 |
| 2021/0184728 | A1 * | 6/2021 | Kang | H04B 5/48 |
| 2022/0270073 | A1 * | 8/2022 | Chen | G06F 11/3648 |
| 2025/0062792 | A1 * | 2/2025 | Cordier | H04B 5/77 |

* cited by examiner

*Primary Examiner* — Md K Talukder  
(74) *Attorney, Agent, or Firm* — Alston & Bird LLP

(57) ABSTRACT

An integrated circuit comprises processing circuitry and near-field communication (NFC) circuitry comprising read/write (RW) circuitry and card emulation (CE) circuitry. The processing circuitry selectively performs a direct loopback test by (i) causing the RW circuitry to transmit first test data, (ii) causing the CE circuitry to receive the transmitted first test data, and (iii) comparing the received first test data and the transmitted first test data. The processing circuitry selectively performs a reverse loopback test by (i) causing the RW circuitry to generate a continuous wave, (ii) causing the CE circuitry to modulate second test data onto the continuous wave and transmitting the modulated continuous wave, (iii) causing the RW circuitry to receive and demodulate the modulated continuous wave to extract the second test data, and (iv) comparing the extracted second test data and the second test data prior to being modulated by the CE circuitry.

20 Claims, 8 Drawing Sheets

DIRECT LOOPBACK TEST

REVERSE LOOPBACK TEST

TESTING OF NEAR-FIELD COMMUNICATION CARD AND READER

FIELD OF THE INVENTION

Example embodiments of the present disclosure relate generally to near-field communication and, more particularly, to testing near-field communication functionality.

BACKGROUND

Applicant has identified many technical challenges and difficulties associated with the testing of integrated circuits and devices that provide near-field communication capability. Through applied effort, ingenuity, and innovation, Applicant has solved problems related to such testing by developing solutions embodied in the present disclosure, which are described in detail below.

BRIEF SUMMARY

Various embodiments described herein related to integrated circuits, methods, apparatuses, and systems having near-field communication (NFC) test capability.

In accordance with some embodiments of the present disclosure, an example integrated circuit is provided. In some embodiments, the example integrated circuit comprises processing circuitry and near-field communication (NFC) circuitry comprising read/write (RW) circuitry and card emulation (CE) circuitry. The processing circuitry selectively performs a direct loopback test by (i) causing the RW circuitry to transmit first test data, (ii) causing the CE circuitry to receive the transmitted first test data, and (iii) comparing the received first test data and the transmitted first test data. The processing circuitry selectively performs a reverse loopback test by (i) causing the RW circuitry to generate a continuous wave, (ii) causing the CE circuitry to modulate second test data onto the continuous wave and transmitting the modulated continuous wave, (iii) causing the RW circuitry to receive and demodulate the modulated continuous wave to extract the second test data, and (iv) comparing the extracted second test data and the second test data prior to being modulated by the CE circuitry.

In some embodiments, the processing circuitry simultaneously causes the RW circuitry to transmit the first test data and the CE circuitry to receive the transmitted first test data. The processing circuitry simultaneously causes the CE circuitry to modulate second test data onto the continuous wave and transmitting the modulated continuous wave and the RW circuitry to receive and demodulate the modulated continuous wave to extract the second test data.

In some embodiments, the processing circuitry causes the CE circuitry to modulate the continuous wave a plurality of times using a plurality of different coding schemes, each coding scheme corresponding to at least an NFC standard and a predefined bit rate.

In some embodiments, the first test data and the second test data are user-provided.

In some embodiments, the second test data modulated onto the continuous wave comprises the first test data.

In some embodiments, the CE circuitry modulates the second test data onto the continuous wave using passive load modulation.

In some embodiments, the CE circuitry switches between two resistance values to modulate the second test data onto the continuous wave using passive load modulation.

In some embodiments, the integrated circuit further comprises a plurality of switchable resistors between a Cdmp pin and a ground. The CE circuitry switches between two of the plurality of switchable resistors between the Cdmp pin and the ground to switch between the two resistance values.

In some embodiments, a first one of the two resistance values is selected by closing a respective switch associated with each of the plurality of switchable resistors, and a second one of the two resistance values is selected by closing a respective switch associated with each of one or more, but fewer than all, of the plurality of switchable resistors.

In some embodiments, the processing circuitry causes the CE circuitry to modulate the continuous wave a plurality of times using a plurality of different resistance values and transmit the plurality of differently modulated continuous waves. The processing circuitry determines which of plurality of differently modulated continuous waves has a modulated portion with an amplitude greater than a predefined threshold.

In accordance with some embodiments of the present disclosure, an example method is provided. In some embodiments, the example method comprises: performing a direct loopback test by (i) transmitting, by the RW circuitry, first test data, (ii) receiving, by the CE circuitry, the transmitted first test data, and (iii) comparing, by the processing circuitry, the received first test data and the transmitted first test data; and performing a reverse loopback test by (i) generating, by the RW circuitry, a continuous wave, (ii) modulating, by the CE circuitry, second test data onto the continuous wave and transmitting the modulated continuous wave, (iii) receiving and demodulating, by the RW circuitry, the modulated continuous wave to extract the second test data, and (iv) comparing, by the processing circuitry, the extracted second test data and the second test data prior to being modulated by the CE circuitry.

In some embodiments, the RW circuitry and the CE circuitry operate simultaneously during the direct loopback test and the RW circuitry and the CE circuitry operate simultaneously during the reverse loopback test.

In some embodiments, the CE circuitry modulates the continuous wave a plurality of times using a plurality of different coding schemes, each coding scheme corresponding to at least an NFC standard and a predefined bit rate.

In some embodiments, the first test data and the second test data are user-provided.

In some embodiments, the second test data modulated onto the continuous wave comprises the first test data.

In some embodiments, the CE circuitry modulates the second test data onto the continuous wave using passive load modulation.

In some embodiments, the CE circuitry switches between two resistance values to modulate the second test data onto the continuous wave using passive load modulation.

In some embodiments, the integrated circuit further comprises a plurality of switchable resistors between a Cdmp pin and a ground. The CE circuitry switches between two of the plurality of switchable resistors between the Cdmp pin and the ground to switch between the two resistance values.

In some embodiments, the CE circuitry selects a first one of the two resistance values by closing a respective switch associated with each of the plurality of switchable resistors. The CE circuitry selects a second one of the two resistance values by closing a respective switch associated with each of one or more, but fewer than all, of the plurality of switchable resistors.

In some embodiments, the CE circuitry modulates the continuous wave a plurality of times using a plurality of different resistance values and transmits the plurality of differently modulated continuous waves. The processing circuitry determines which of the plurality of differently modulated continuous waves has a modulated portion with an amplitude greater than a predefined threshold.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 7 illustrates a portion of an example circuit design of a device having NFC capability;

FIG. 8 illustrates example performance test results an example direct loopback test, in accordance with some embodiments of the present disclosure.

DETAILED DESCRIPTION OF THE INVENTION

Figure 1:
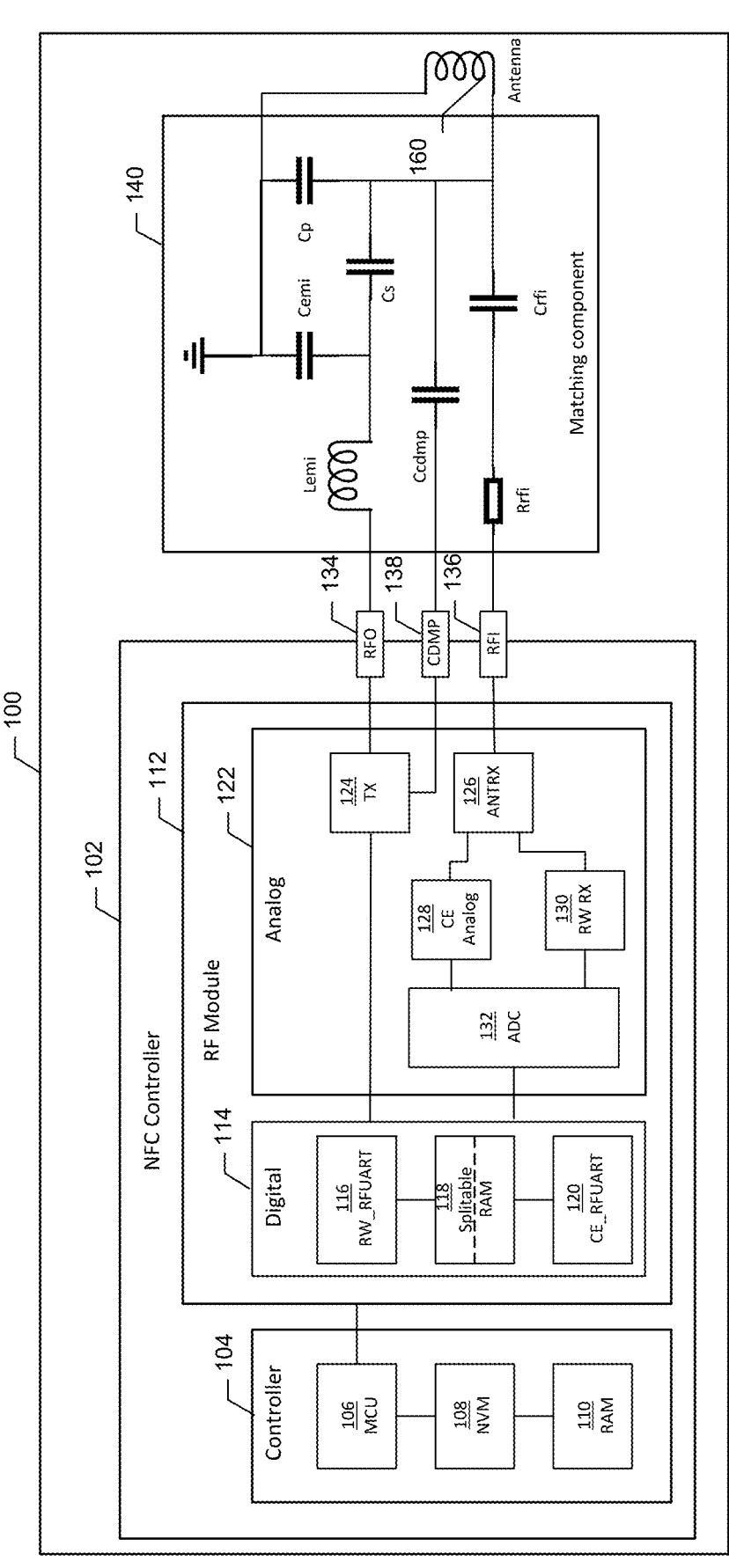
FIG. 1 illustrates an example circuit design of a device having NFC capability.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Near-field communication (NFC) is a set of communication protocols that enables communication between two electronic devices over a distance of 4 centimeters or less. Examples of NFC technology include radio frequency identification (RFID), in which an active reader interfaces with a passive RFID card, tag, etc. to cause the RFID card, tag, etc. to transmit information stored on the RFID card, tag, etc. to the RFID reader.

Another example of NFC technology includes contactless payments. Example of contactless payment include a point-of-sale (POS) terminal which includes an NFC reader that can read a payment card that has an NFC chip embedded therein.

Such contactless payments have expanded to use mobile phones, wearable devices, and the like (for simplicity, these devices will be referred to herein collectively as mobile devices) to store payment information (e.g., credit card number) therein instead of a user having to present the physical payment card. In such embodiments, a POS terminal which includes an NFC reader can interface with the mobile phone to obtain the payment information.

To facilitate contactless payments (and other functionality), NFC capability is built into many mobile devices. Typically, such mobile devices have the circuitry to enable NFC functionality in two (or more) modes. In one NFC mode, termed Card Emulation (CE), the mobile device functions similar to a payment card described above and interfaces with a POS terminal to provide payment information stored on the device. In another NFC mode, called Read/Write (RW), the mobile device functions similar to a POS terminal described above and can interface with and read payment information from a payment card or another mobile device emulating a payment card.

During an NFC operation in a mobile device having such two mode NFC capability, either the CE mode is active or the RW mode is active. Conventionally, the two modes would typically not be active at the same time.

FIG. 1 illustrates an example circuit design of a device having NFC capability, such as a mobile device. The device 100 of FIG. 1 comprises an NFC controller integrated circuit (IC) 102, a matching component 140, and an antenna 160. The NFC controller IC 102 comprises a controller module 104 and a radio frequency (RF) module 112. The controller module 104 comprises a master control unit (MCU) 106 (which may also be termed a controller, a processor, or processing circuitry), non-volatile memory (NVM) 108, and random access memory (RAM) 110. The RF module comprises a digital block 114 and an analog block 122. The digital block 114 comprises a Radio Frequency Universal Asynchronous Receiver/Transmitter for the RW mode (RW_RFUART) 116, a Radio Frequency Universal Asynchronous Receiver/Transmitter for the CE mode (CE_RFUART) 120, and splitable RAM 118 that is used by both the RW_RFUART 116 and the CE_RFUART 120. The analog block 122 comprises transmitter (TX) circuitry 124 to modulate signals from the digital block 114 to be transmitted. The analog block 122 further comprises circuitry to demodulate received signals and provide the demodulated signals to the digital block 114, namely antenna receiver (ANTRX) circuitry 126, CE analog circuitry 128, RW receiving (RW RX) circuitry 130, and an analog-to-digital controller (ADC) 132. The NFC controller IC 102 has an RF output (RFO) pin 134, a CDMP pin 138, and an RF input (RFI) pin 136 to connect the NFC controller IC 102 to the matching component 140 and in turn to the antenna 160.

A matching component provides impedance matching to an antenna, and therefore may vary depending on the specific design of the antenna and the NFC-capable device. In the illustrated embodiment, the matching component 140 comprises an inductor Lemi and capacitors Cs, Cemi, and Cp between the RFO pin 134 and ground, a damping capacitor Cedmp connected to the CDMP pin 138, and a resistor Rrfi and capacitor Crfi between the RFI pin 136 and the antenna 160.

FIG. 1 is a simplified circuit design of a device having NFC capability in single ended mode. Although not illustrated, in a real-world application such a device typically includes two RFO pins, two RFI pins, two Cdmp pins, two antenna connections, and a correspondingly more complex matching component to provide communication in differential mode.

It is desirable to test the NFC hardware (circuitry) and firmware (stored software), before and/or after the NFC components have been installed in a device during manufacture to catch defects before a defective device is shipped out to a customer. Such testing may be done by the manufacturer of the NFC components and/or by the manufacturer of the mobile device. Currently, testing is performed using NFC specific equipment on the production line to test the NFC functionality. For example, an NFC tag or card emulator is used to test the RW functionality of the device, while an NFC reader is used to test the CE functionality of the device.

There are at least three drawbacks of such existing test methods. One, the current testing requires specific test equipment in the factory. Two, the current testing is time consuming. Three, the current testing of functionality may miss some defects.

Various embodiments of the present disclosure overcome the above technical challenges and difficulties and provide various technical improvements and advantages based on, for example, but not limited to, providing example integrated circuits, methods, devices, and systems for testing NFC circuitry and functionality.

Embodiments of the present disclosure provide an integrated circuit and method for testing NFC hardware and firmware quickly, using the existing NFC circuitry, and without any external test equipment.

Embodiments of the present disclosure involve what are termed a direct loopback test and a reverse loopback test. For both tests, the CE mode and the RW mode are active at the same time.

Embodiments of the present disclosure provide a direct loopback test in which the RW circuitry transmits test data which is received by the CE circuitry. The received test data is compared to the transmitted test data to detect errors.

Embodiments of the present disclosure provide a reverse loopback test in which the RW circuitry generates a continuous wave (which may also be termed a carrier wave), the CE circuitry modulates test data onto the continuous wave and transmits the modulated continuous wave, and the RW circuitry receives and demodulates the modulated continuous wave to extract the test data. The received test data is compared to the transmitted test data to detect errors.

In various embodiments of the present disclosure, differences in the received and transmitted test data in the direct and/or reverse loopback tests indicate errors in the circuitry (e.g., missing or damaged components). In various embodiments of the present disclosure, the direct and reverse loopback tests return a pass/fail status.

In various embodiments of the present disclosure, since the CE circuitry must send its data modulated on a signal provided by an NFC reader (in this case, the RW circuitry), in the reverse loopback test, the RW circuitry transmits a continuous wave (CW) signal upon which the CE circuitry modulates its test data using passive load modulation (PLM). In various embodiments, the CW comprises a 13.56 MHz signal.

In various embodiments of the present disclosure, the CE circuitry switches between two resistance values to modulate the test data onto the continuous wave using passive load modulation. In various embodiments of the present disclosure, the passive load modulation amplitude in the reverse loopback test can be configured in as many as 1024 different ways by selecting any one or a combination of multiple ones of ten switchable resistors that connect the CDMP pin seen in the figures above to ground.

In various embodiments of the present disclosure, a first one of the two resistance values is selected by closing a respective switch associated with all of the plurality of switchable resistors and a second one of the two resistance values is selected by closing a respective switch associated with each of one or more, but fewer than all, of the plurality of switchable resistors.

In various embodiments of the present disclosure, a large number of different resistance values can be selected and the CE response strength measured to ensure a desired response level.

In various embodiments of the present disclosure, the CE circuitry modulates the continuous wave a plurality of times using a plurality of different coding schemes. In various embodiments, each different coding scheme corresponds to an NFC standard and a predefined bit rate. For example, the following coding schemes may be used: A106, A212, A424, A848, B106, B212, B424, B848, F212, F424, where Axxx and Bxxx refer to the ISO14443 standard (A or B) and the various bitrates (106, 212, 424, or 848 kilobits per second (kbps)) defined in these standards, and where Fxxx refers to the FeliCa standard, also known as the Japanese JIS X 6319-4 standard and the various bitrates (212 or 424 kbps) defined in this standard. In some embodiments, a 255 byte fixed pattern may be used. In some embodiments, the test data used in the loopback tests can be user defined or generated by the NFC firmware (e.g., using a pseudorandom binary sequence (PRBS) generator). An example of 2 bytes user defined data is 0xAAAA. In some embodiments, the same test data is used in the direct loopback test and the reverse loopback test. In some embodiments, different test data is used in the direct loopback test and the reverse loopback test (in which case, the test data used in the direct loopback test may be termed "first data" and the test data used in the reverse loopback test may be termed "second data").

In various embodiments of the present disclosure, the NFC testing described herein uses conventional NFC circuitry used in conventional devices having NFC functionality. No changes to the conventional NFC circuitry are needed to run the direct and reverse loopback tests; it is only necessary to program the firmware accordingly. No external equipment is needed to perform the direct and reverse loopback tests. The direct and reverse loopback tests can be performed as needed before and/or after installation of the NFC hardware in the mobile device. The direct and reverse loopback tests provide results very quickly.

In various embodiments of the present disclosure, the direct loopback test and the reverse loopback test can be performed on an NFC controller (such as the NFC controller 102 in FIG. 1) before being installed in a device by directly connecting the RFO and RFI pins.

In various embodiments of the present disclosure, the direct loopback test and the reverse loopback test can be performed on an NFC controller (such as the NFC controller 102 in FIG. 1) before being installed in a device by connecting a sample matching component and antenna to the RFO, Cdmp, and RFI pins.

In various embodiments of the present disclosure, the direct loopback test and the reverse loopback test can be performed after an NFC controller (such as the NFC controller 102 in FIG. 1) after being installed in a device, in which case the loopback tests may also detect errors in the matching component, the antenna, and/or connections between the NFC controller, the matching component, and/or the antenna. In various embodiments of the present disclosure, the direct loopback test and the reverse loopback test are initiated automatically or based on user input.

Figure 2:
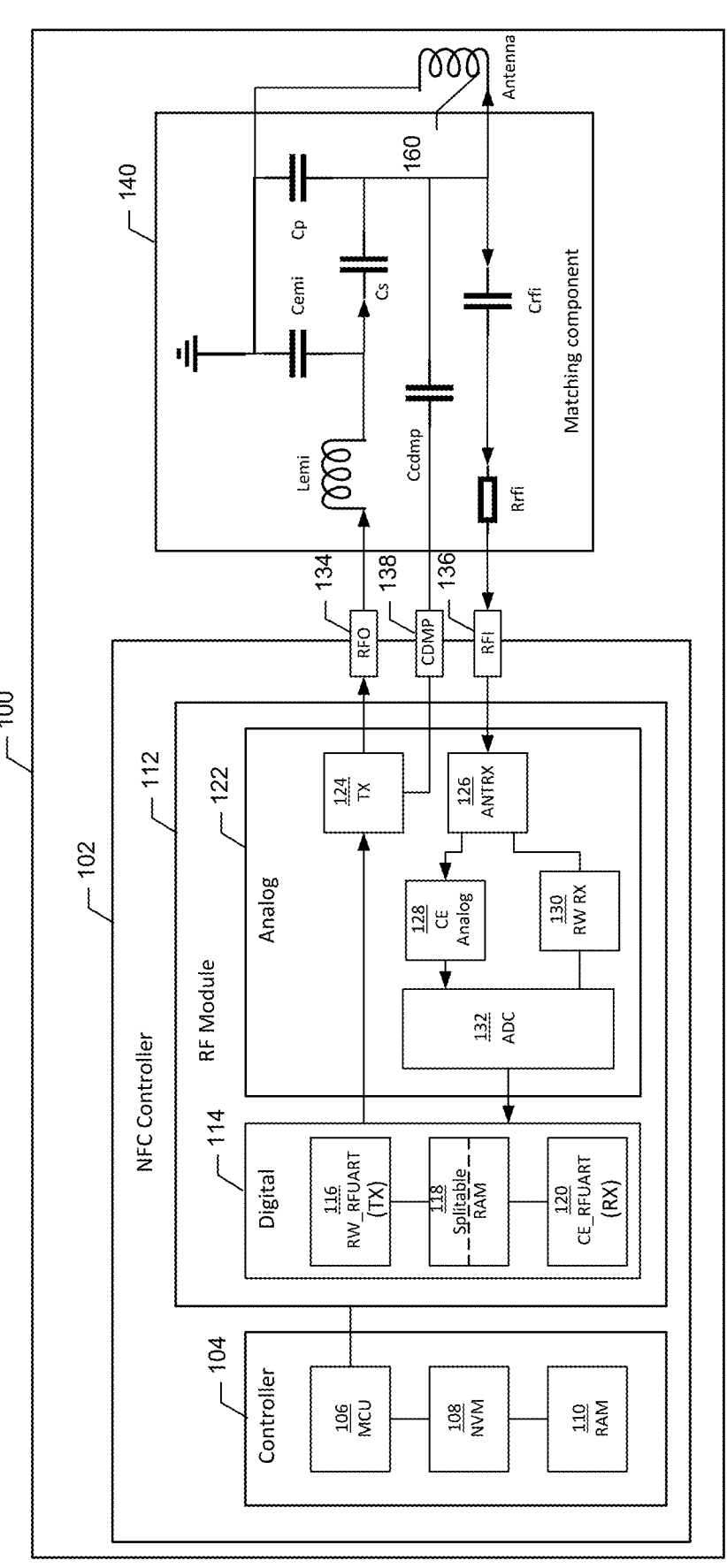
FIG. 2 illustrates the example circuit design of FIG. 1 with a direct loopback test process flow, in accordance with some embodiments of the present disclosure.

FIG. 2 illustrates the same example circuit design as FIG. 1, with a direct loopback test process flow overlaid. In some embodiments, the direct loopback test is controlled by the controller module 104, and specifically the MCU 106, according to firmware stored in the NVM 108. In some embodiments, the test data to be used is also stored in the NVM 108. In some embodiments, one or more commands are sent from the MCU 106 to the RF module 112 to cause the RW_RFUART 116 (which is marked with "(TX)" in FIG. 2 to indicate that the RW_RFUART 116 is transmitting in the direct loopback test) to compress the test data and provide the test data to the transmitter circuitry 124 (as indicated by the arrow therebetween) and to cause the transmitter (TX) circuitry 124 to modulate and transmit the test data to the RFO pin 134 (as indicated by the arrow therebetween). In some embodiments, the transmitted test data travels through the matching component 140 (as indicated by the arrows within the matching component 140) and returns to the NFC controller 102 from the matching component 140 via the RFI pin 136 (as indicated by the arrow therebetween). In some embodiments, the test data is received by the antenna receiver (ANTRX) circuitry 126, demodulated by the CE analog circuitry 128, and converted from analog to digital by the ADC 132 (as indicated by the arrows within the analog block 122). In some embodiments, the test data is sent from the ADC 132 to the CE_RFUART 120 (which is marked with "(RX)" in FIG. 2 to indicate that the CE_RFUART 120 is receiving in the direct loopback test) (as indicated by the arrow between the ADC 132 and the digital block 114) to decompress the test data and provide the test data to the MCU 106. In some embodiments, the MCU 106 then compares the received test data to the sent test data to see if they match. In some embodiments, the MCU 106 provides a "pass" indication for the direct loopback test if the received test data and the sent test data match, and provides a "fail" indication for the direct loopback test if the received test data and the sent test data do not match.

Figure 3:
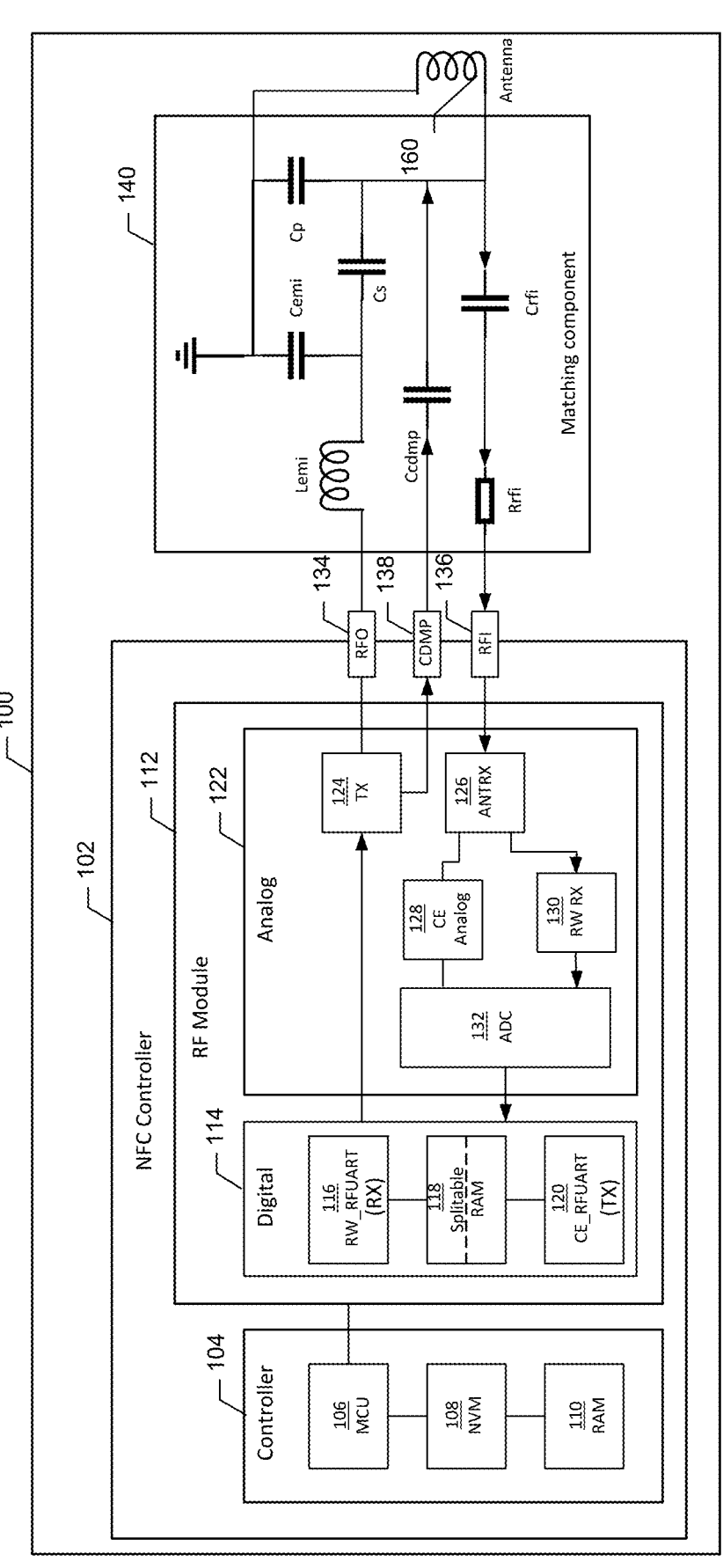
FIG. 3 illustrates the example circuit design of FIG. 1 with a reverse loopback test process flow, in accordance with some embodiments of the present disclosure.

FIG. 3 illustrates the same example circuit design as FIG. 1, with a reverse loopback test process flow overlaid. In some embodiments, the reverse loopback test is controlled by the controller module 104, and specifically the MCU 106, according to firmware stored in the NVM 108. In some embodiments, the test data to be used is also stored in the NVM 108. In some embodiments, one or more commands are sent from the MCU 106 to the RF module 112 to cause the RW_RFUART 116 to produce a continuous wave and to cause the CE_RFUART 120 (which is marked with "(TX)" in FIG. 3 to indicate that the CE_RFUART 120 is transmitting in the reverse loopback test) to compress the test data and provide the test data to the transmitter circuitry 124 (as indicated by the arrow therebetween) and to cause the transmitter (TX) circuitry 124 to modulate the test data onto the continuous wave and transmit the continuous wave modulated with the test data to the CDMP pin 138 (as indicated by the arrow therebetween). In some embodiments, the transmitted continuous wave modulated with the test data travels through the matching component 140 (as indicated by the arrows within the matching component 140) and returns to the NFC controller 102 from the matching component 140 via the RFI pin 136 (as indicated by the arrow therebetween). In some embodiments, the continuous wave modulated with the test data is received by the antenna receiver (ANTRX) circuitry 126, demodulated by the RW RX circuitry 130, and converted from analog to digital by the ADC 132 (as indicated by the arrows within the analog block 122). In some embodiments, the test data is sent from the ADC 132 to the RX_RFUART 116 (which is marked with "(RX)" in FIG. 3 to indicate that the RX_RFUART 116 is receiving in the reverse loopback test) (as indicated by the arrow between the ADC 132 and the digital block 114) to decompress the test data and provide the test data to the MCU 106. In some embodiments, the MCU 106 then compares the received test data to the sent test data to see if they match. In some embodiments, the MCU 106 provides a "pass" indication for the reverse loopback test if the received test data and the sent test data match, and provides a "fail" indication for the reverse loopback test if the received test data and the sent test data do not match.

Figure 4:
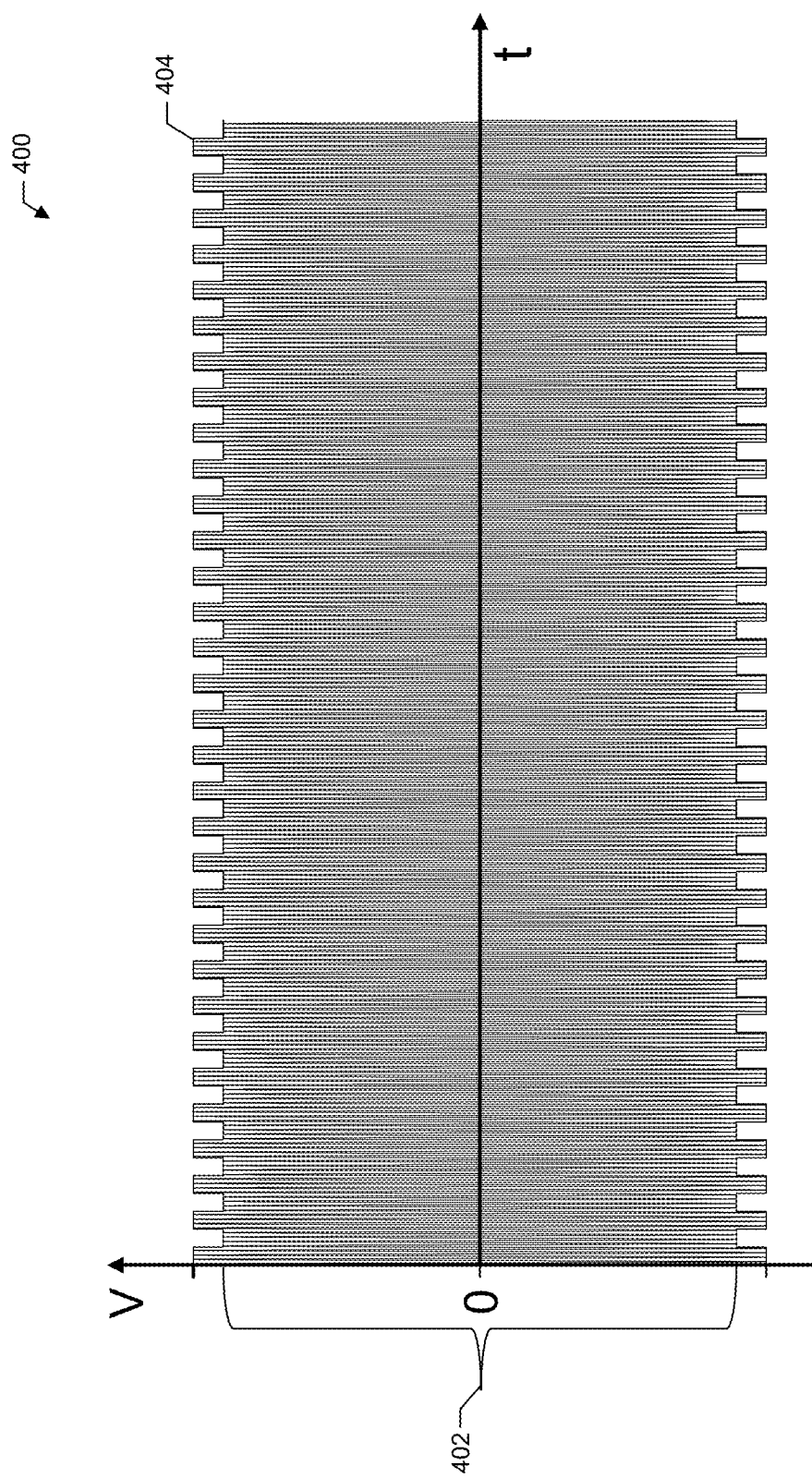
FIG. 4 illustrates an example modulated signal of an example reverse loopback test, in accordance with some embodiments of the present disclosure.

FIG. 4 illustrates an example modulated signal of an example reverse loopback test, in accordance with various embodiments of the present disclosure. FIG. 4 illustrates a modulated signal 400 comprising a continuous wave 402 and modulated test data 404 onto the continuous wave. In some embodiments, the type of modulation used is determined by the NFC standard being tested. For example, the type of modulation used may be on-off keying.

Figure 5:
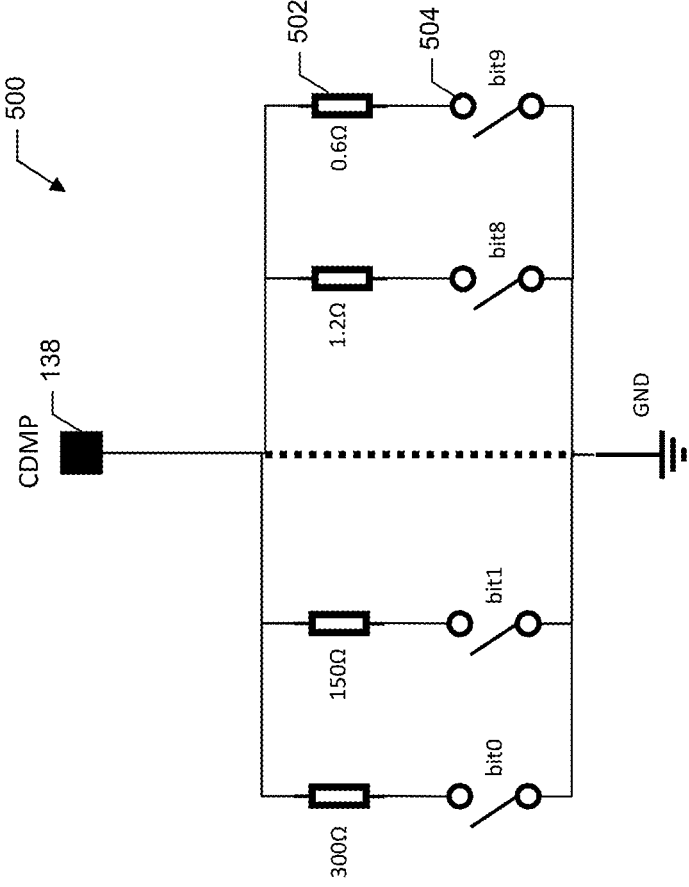
FIG. 5 illustrates a portion of an example circuit design of a device having NFC capability.

As described above, in some embodiments passive load modulation (PLM) is used to modulate the test data onto the continuous wave. In some embodiments, the amplitude of the PLM is configured using a plurality of switchable parallel binary weighted resistors between the CDMP pin and ground. FIG. 5 illustrates an example circuit 500 comprising ten such resistors 502 (only four resistors are shown for simplicity), each resistor switchable between the CDMP pin 138 and ground (GND) via a corresponding switch 504. In some embodiments, the unmodulated state corresponds to all resistors 502 selected (i.e., by closing all switches 504) and the modulated state can be selected by selecting any one or more (but not all) resistors (i.e., by closing the corresponding switches 504). Thus, in some embodiments the continuous wave is modulated by alternatingly closing all of the switches 504 to select all of the resistors 502 and opening all of the switches 504 except those switches associated with the one or more resistors 502 that will provide the desired amplitude of the test data modulation (e.g., modulation 404 in FIG. 4).

In the illustrated embodiment with ten resistors, there are 1024 possible resistor combinations and therefore 1023 possible modulation amplitudes (there is one less possible modulation amplitude than the total possible resistor combinations because one of the resistor combinations (all resistors selected) provides the unmodulated state). In the illustrated embodiment, the resistors range from 0.6 ohms to 300 ohms, each resistor being approximately double the resistance of the preceding one. In alternative embodiments, other numbers of resistors and resistance values may be used.

In various embodiments of the present disclosure, a performance test using the reverse loopback test is performed by selecting a large number of different resistance values and measuring the CE response strength to ensure a desired response level. In some embodiments, the strength of the modulated test data (e.g., modulation 404 in FIG. 4) is measured in dBc as an expression of how much lower magnitude the modulated test data is compared to the continuous wave. In some embodiments, it is preferred that the modulated test data be at least −75 dBc. That is, in some embodiments it is preferred that the modulated test data be no less than 75 dB less than the continuous wave.

Figure 6:
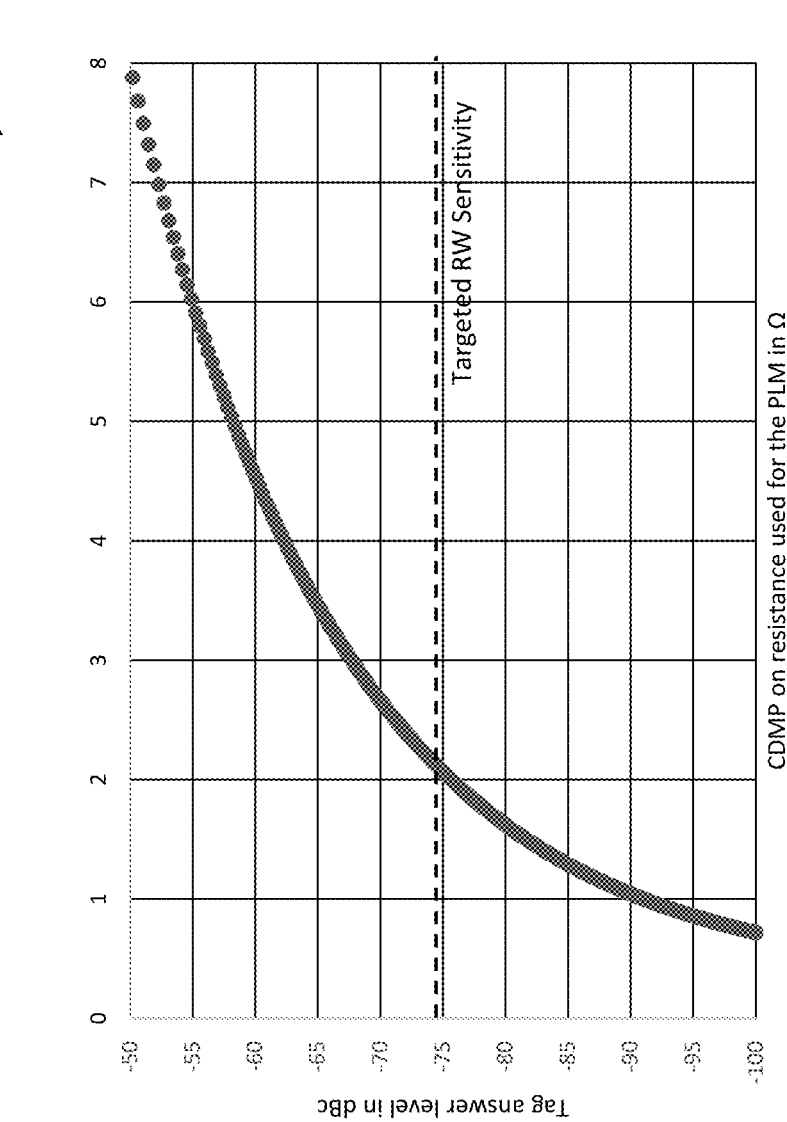
FIG. 6 illustrates example performance test results an example reverse loopback test, in accordance with some embodiments of the present disclosure.

FIG. 6 illustrates example performance test results for an example reverse loopback test, in accordance with some embodiments of the present disclosure. In the graph 600 of FIG. 6, the CE response strength (termed "Tag answer level" in FIG. 6) is plotted against many different resistance values. A desired response threshold of −75 dBc is shown as a dashed line on FIG. 6. The response graph 600 of FIG. 6 shows that the desired response is achieved when the resistance is greater than about 2 ohms. In this regard, the device can be configured to use an appropriate resistance value during NFC operations.

Additionally or alternatively, it is also possible to use a configurable TX driver resistance (which has 256 possible values) to produce the card/tag signal to measure performance.

Figures 7, 8:
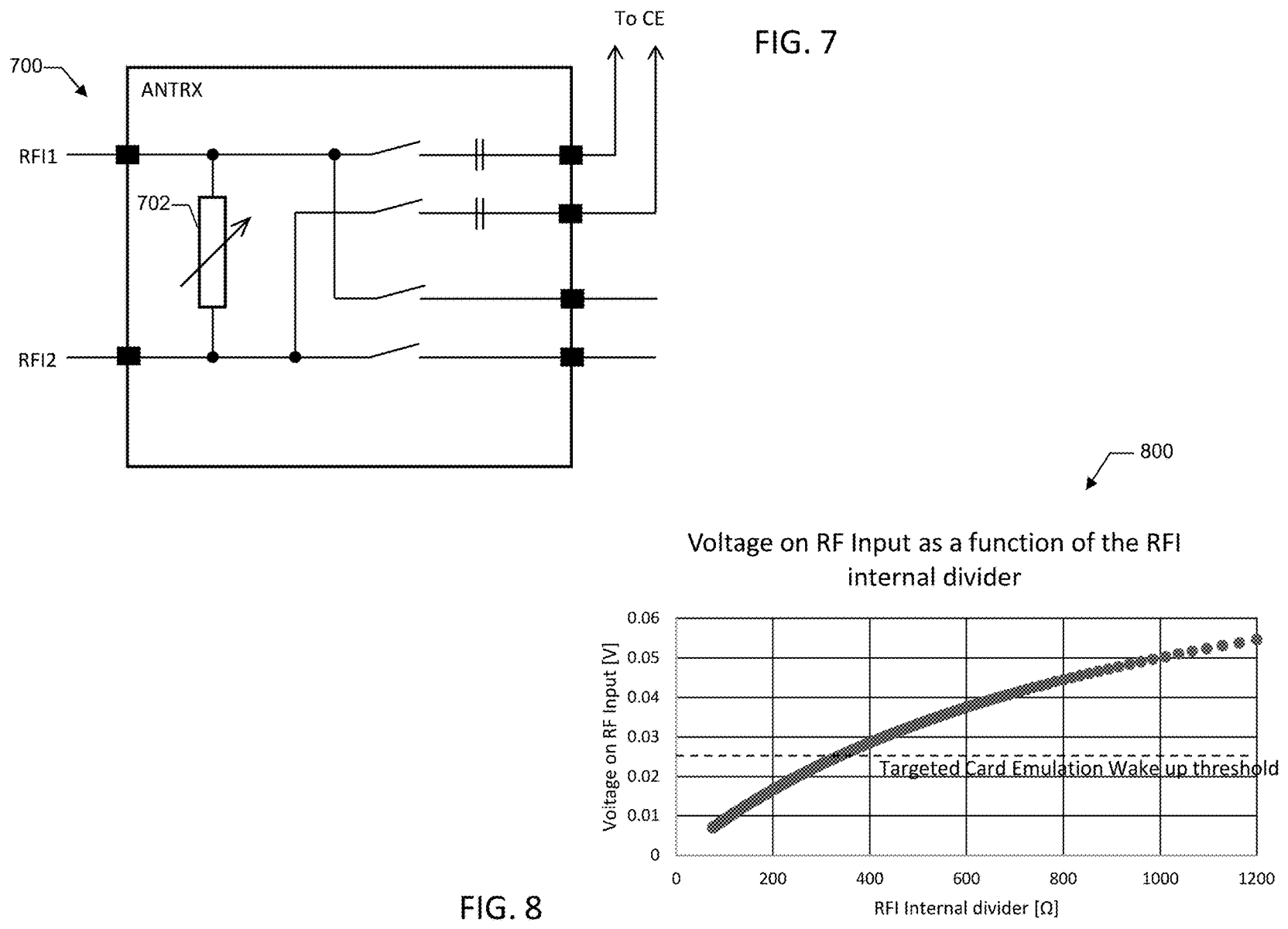

This performance measurement function can be used to optimize the configuration in order to get the desired sensitivity and to perform robustness tests automatically and without the use of laboratory equipment In various embodiments of the present disclosure, a performance test using the direct loopback test is performed to measure the minimum signal required to start communication with the RW circuitry (this may be termed a "targeted card emulation wake-up threshold"). This minimum signal is the voltage on the RF input (RFI) in millivolts, and correlates to the distance to a reader. In some embodiments, typical values for this minimum signal are tens of millivolts. In one specific example embodiment, a minimum signal threshold is 25 millivolts. As described above, a device having NFC capability typically includes two RFI pins (not illustrated). As illustrated in FIG. 7, such a conventional device having NFC capability typically includes a circuit portion 700 having a resistive divider 702 between RFI 1 and RFI 2. In one specific example, such a resistive divider has nine binary weighted segments, which, along with a 1 kiloohm resistor in the matching component, provides 512 voltage division ratios over a control range of 75 ohms to 40 kiloohms.

FIG. 8 illustrates example performance test results for an example direct loopback test, in accordance with some embodiments of the present disclosure. In the graph 800 of FIG. 8, the RFI voltage is plotted against many different resistance values from the RFI internal resistive divider 702. A desired response of 25 millivolts is shown as a dashed line on FIG. 8. The response graph 800 of FIG. 8 shows that the desired response is achieved when the resistance is greater than about 300 ohms. In this regard, the device can be configured to use an appropriate resistance value during NFC operations.

In a conventional device having NFC capability, there are typically other parameters than can be adjusted to modify the voltage on the RFI, such as the supply voltage of the drivers, the driver resistance, a pulse width modulation (PWM) of the output, resulting in 500,000 power steps ranging from 0 watt to 2 watts. In some embodiments, some or all of these parameters can be combined to generate a very large number of different voltages on the RFI, modulate a signal on top of this voltage, and check the performance.

Figure 9B:
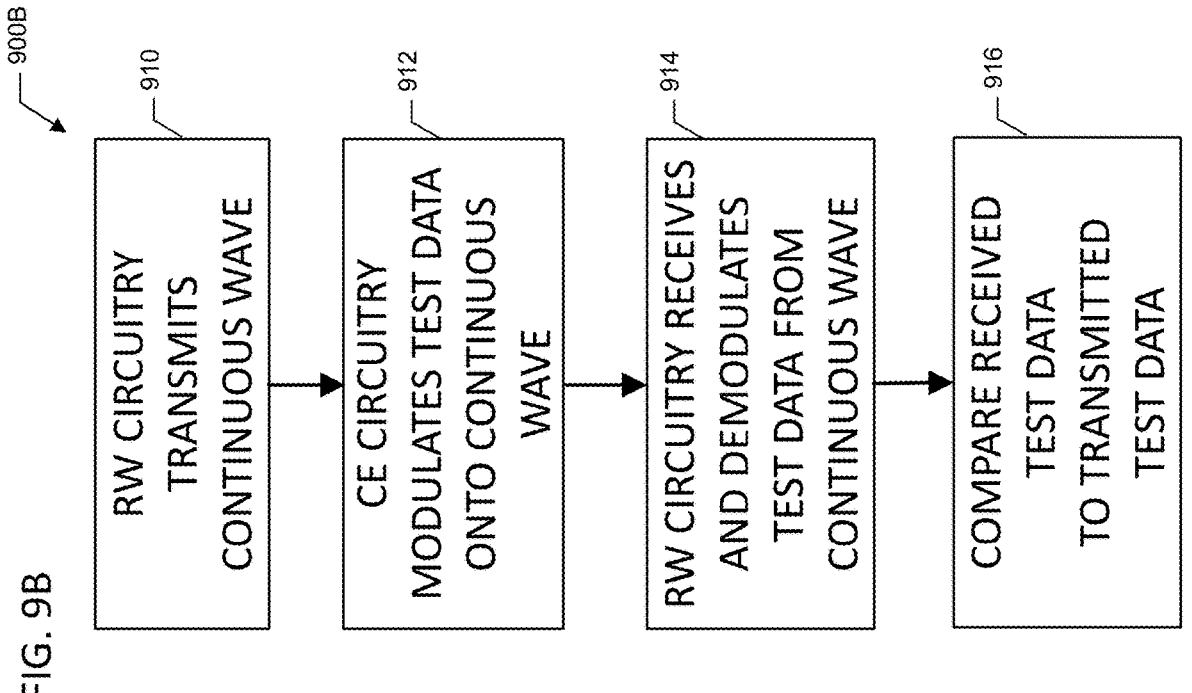
FIGS. 9A and 9B are example flow diagrams illustrating example methods for performing, respectively, a direct loopback test and a reverse loopback test, in accordance with example embodiments of the present disclosure.
Figure 9A:
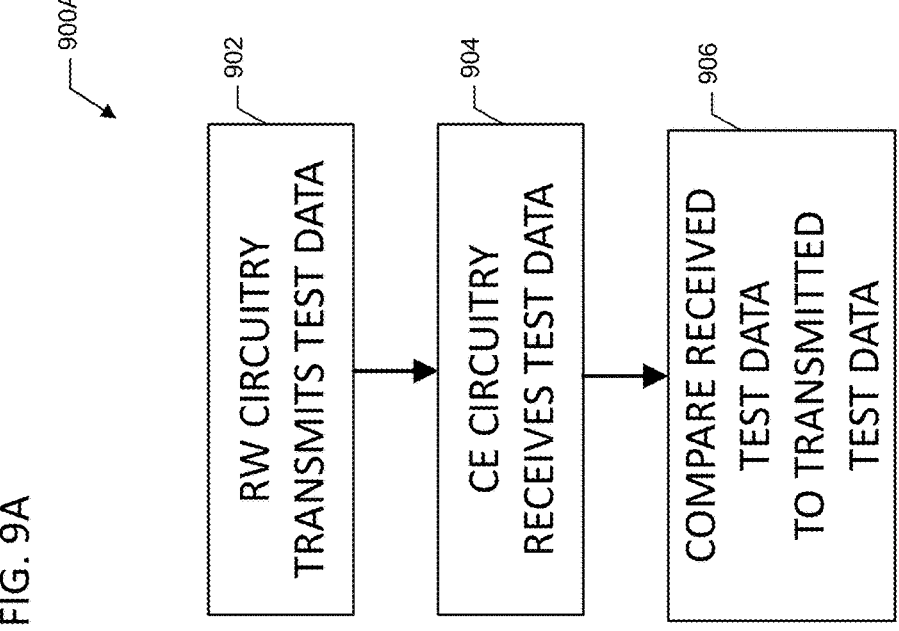

Reference will now be made to FIGS. 9A and 9B, each of which provides a flowchart illustrating example steps, processes, procedures, and/or operations in accordance with various embodiments of the present disclosure. Various methods described herein, including, for example, example methods as shown in FIGS. 9A and 9B, may provide various technical benefits and improvements. It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIGS. 9A and 9B may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including being comprised entirely of hardware or any combination of software and hardware.

Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 9A, an example flow diagram illustrating an example method 900A for performing a direct loopback test of an NFC integrated circuit and/or device in accordance with some embodiments of the present disclosure is illustrated. In some embodiments, the example method 900A may be implemented by an example computing apparatus described herein, including, but not limited to, the example device 100 having NFC capability, described above in connection with FIG. 2.

In the example method shown in FIG. 9A, the example method 900A starts at step/operation 902. At step/operation 902, a processor (such as, but not limited to, the MCU 106 of the device 100 described above in connection with FIG. 2) causes RW circuitry of the device to transmit test data to an RFO pin. As described above, the test data may be stored in non-volatile memory or may be user-provided. As described above, in some embodiments the test data is encoded by a Radio Frequency Universal Asynchronous Receiver/Transmitter for the RW mode (RW_RFUART) and modulated/transmitted by transmitter (TX) circuitry.

At step/operation 904, a processor (such as, but not limited to, the MCU 106 of the device 100 described above in connection with FIG. 2) causes CE circuitry of the device to receive the transmitted test data. As described above, in some embodiments the transmitted test data is received by antenna receiver (ANTRX) circuitry, demodulated by CE analog circuitry, a converted from analog to digital by an analog-to-digital controller, and decoded by a Radio Frequency Universal Asynchronous Receiver/Transmitter for the CE mode (CE_RFUART).

At step/operation 906, a processor (such as, but not limited to, the MCU 106 of the device 100 described above in connection with FIG. 2) compares the received test data to the sent test data to see if they match. In some embodiments, the processor provides a "pass" indication for the direct loopback test if the received test data and the sent test data match, and provides a "fail" indication for the direct loopback test if the received test data and the sent test data do not match.

Referring now to FIG. 9B, an example flow diagram illustrating an example method 900B for performing a reverse loopback test of an NFC integrated circuit and/or device in accordance with some embodiments of the present disclosure is illustrated. In some embodiments, the example method 900B may be implemented by an example computing apparatus described herein, including, but not limited to, the example device 100 having NFC capability, described above in connection with FIG. 3.

In the example method shown in FIG. 9B, the example method 900B starts at step/operation 910. At step/operation 910, a processor (such as, but not limited to, the MCU 106 of the device 100 described above in connection with FIG. 3) causes RW circuitry of the device to transmit a continuous wave. As described above, in some embodiments the continuous wave is produced by a Radio Frequency Universal Asynchronous Receiver/Transmitter for the RW mode (RW_RFUART).

At step/operation 912, a processor (such as, but not limited to, the MCU 106 of the device 100 described above in connection with FIG. 3) causes CE circuitry of the device to modulate test data onto the continuous wave and transmit the modulated continuous wave. As described above, the test data may be stored in non-volatile memory or may be user-provided. As described above, in some embodiments the test data is encoded by a Radio Frequency Universal Asynchronous Receiver/Transmitter for the CE mode (CE_RFUART) and modulated/transmitted by transmitter (TX) circuitry.

At step/operation 914, a processor (such as, but not limited to, the MCU 106 of the device 100 described above in connection with FIG. 3) causes the RW circuitry of the device to receive and demodulate the modulated test data. As described above, in some embodiments the modulated test data is received by antenna receiver (ANTRX) circuitry, demodulated by RW receiving circuitry, a converted from analog to digital by an analog-to-digital controller, and decoded by a Radio Frequency Universal Asynchronous Receiver/Transmitter for the RW mode (RW_RFUART).

At step/operation 916, a processor (such as, but not limited to, the MCU 106 of the device 100 described above in connection with FIG. 3) compares the received test data to the sent test data to see if they match. In some embodiments, the processor provides a "pass" indication for the direct loopback test if the received test data and the sent test data match, and provides a "fail" indication for the direct loopback test if the received test data and the sent test data do not match.

CONCLUSION

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to fragmented wideband tympanometry techniques for true wireless stereo, however, one skilled in the art may recognize that such principles may be applied to any audio device. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure.

While this detailed description has set forth some embodiments of the present disclosure, the appended claims cover other embodiments of the present disclosure which differ from the described embodiments according to various modifications and improvements. For example, the appended claims can cover any form of integrated circuit which provides NFC functionality, such as but not limited to NFC controllers which include a microcontroller, NFC front ends connected to an external microcontroller, NFC combos including an NFC controller and a secure element to perform secure transactions, and NFC combos including an NFC controller, a secure element, and an embedded universal integrated circuit card.

Within the appended claims, unless the specific term "means for" or "step for" is used within a given claim, it is not intended that the claim be interpreted under 35 U.S.C. 112, paragraph 6.

What is claimed is:

1. An integrated circuit comprising:
processing circuitry; and
near-field communication (NFC) circuitry comprising read/write (RW) circuitry and card emulation (CE) circuitry;
wherein the processing circuitry selectively performs a direct loopback test by (i) causing the RW circuitry to transmit first test data, (ii) causing the CE circuitry to receive the transmitted first test data, and (iii) comparing the received first test data and the transmitted first test data; and
wherein the processing circuitry selectively performs a reverse loopback test by (i) causing the RW circuitry to generate a continuous wave, (ii) causing the CE circuitry to modulate second test data onto the continuous wave and transmitting the modulated continuous wave, (iii) causing the RW circuitry to receive and demodulate the modulated continuous wave to extract the second test data, and (iv) comparing the extracted second test data and the second test data prior to being modulated by the CE circuitry.

2. The integrated circuit of claim 1, wherein the processing circuitry simultaneously causes the RW circuitry to transmit the first test data and the CE circuitry to receive the transmitted first test data; and
wherein the processing circuitry simultaneously causes the CE circuitry to modulate second test data onto the continuous wave and transmitting the modulated continuous wave and the RW circuitry to receive and demodulate the modulated continuous wave to extract the second test data.

3. The integrated circuit of claim 1, wherein the processing circuitry causes the CE circuitry to modulate the continuous wave a plurality of times using a plurality of different coding schemes, each coding scheme corresponding to at least an NFC standard and a predefined bit rate.

4. The integrated circuit of claim 1, wherein the first test data and the second test data are user-provided.

5. The integrated circuit of claim 1, wherein the second test data modulated onto the continuous wave comprises the first test data.

6. The integrated circuit of claim 1, wherein the CE circuitry modulates the second test data onto the continuous wave using passive load modulation.

7. The integrated circuit of claim 6, wherein the CE circuitry switches between two resistance values to modulate the second test data onto the continuous wave using passive load modulation.

8. The integrated circuit of claim 7, wherein the integrated circuit further comprises a plurality of switchable resistors between a Cdmp pin and a ground; and
wherein the CE circuitry switches between two of the plurality of switchable resistors between the Cdmp pin and the ground to switch between the two resistance values.

9. The integrated circuit of claim 8, wherein a first one of the two resistance values is selected by closing a respective switch associated with each of the plurality of switchable resistors; and
wherein a second one of the two resistance values is selected by closing a respective switch associated with each of one or more, but fewer than all, of the plurality of switchable resistors.

10. The integrated circuit of claim 7, wherein the processing circuitry causes the CE circuitry to modulate the continuous wave a plurality of times using a plurality of different resistance values and transmit the plurality of differently modulated continuous waves; and
wherein the processing circuitry determines which of the plurality of differently modulated continuous waves has a modulated portion with an amplitude greater than a predefined threshold.

11. A method of testing an integrated circuit having processing circuitry and near-field communication (NFC) circuitry comprising read/write (RW) circuitry and card emulation (CE) circuitry, the method comprising:
performing a direct loopback test by (i) transmitting, by the RW circuitry, first test data, (ii) receiving, by the CE circuitry, the transmitted first test data, and (iii) comparing, by the processing circuitry, the received first test data and the transmitted first test data; and
performing a reverse loopback test by (i) generating, by the RW circuitry, a continuous wave, (ii) modulating, by the CE circuitry, second test data onto the continuous wave and transmitting the modulated continuous wave, (iii) receiving and demodulating, by the RW circuitry, the modulated continuous wave to extract the second test data, and (iv) comparing, by the processing circuitry, the extracted second test data and the second test data prior to being modulated by the CE circuitry.

12. The method of claim 11, wherein the RW circuitry and the CE circuitry operate simultaneously during the direct loopback test; and
wherein the RW circuitry and the CE circuitry operate simultaneously during the reverse loopback test.

13. The method of claim 11, wherein the CE circuitry modulates the continuous wave a plurality of times using a plurality of different coding schemes, each coding scheme corresponding to at least an NFC standard and a predefined bit rate.

14. The method of claim 11, wherein the first test data and the second test data are user-provided.

15. The method of claim 11, wherein the second test data modulated onto the continuous wave comprises the first test data.

16. The method of claim 11, wherein the CE circuitry modulates the second test data onto the continuous wave using passive load modulation.

17. The method of claim 16, wherein the CE circuitry switches between two resistance values to modulate the second test data onto the continuous wave using passive load modulation.

18. The method of claim 17, wherein the integrated circuit further comprises a plurality of switchable resistors between a Cdmp pin and a ground; and wherein the CE circuitry switches between two of the plurality of switchable resistors between the Cdmp pin and the ground to switch between the two resistance values.

19. The method of claim 18, wherein the CE circuitry selects a first one of the two resistance values by closing a respective switch associated with each of the plurality of switchable resistors; and wherein the CE circuitry selects a second one of the two resistance values by closing a respective switch associated with each of one or more, but fewer than all, of the plurality of switchable resistors.

20. The method of claim 17, wherein the CE circuitry modulates the continuous wave a plurality of times using a plurality of different resistance values and transmits the plurality of differently modulated continuous waves; and wherein the processing circuitry determines which of the plurality of differently modulated continuous waves has a modulated portion with an amplitude greater than a predefined threshold.

* * * * *